United States Patent [19]

Harada

[11] Patent Number: 5,137,756
[45] Date of Patent: Aug. 11, 1992

[54] VARNISH IMPREGNATION METHOD

[75] Inventor: Mitsuaki Harada, Osaka, Japan

[73] Assignees: Takuma Co., Ltd.; Takuma Research and Development Co., Ltd., both of Osaka, Japan

[21] Appl. No.: 738,953

[22] Filed: Aug. 1, 1991

Related U.S. Application Data

[62] Division of Ser. No. 430,329, Nov. 2, 1989, Pat. No. 5,056,457.

[30] Foreign Application Priority Data

| Nov. 18, 1988 | [JP] | Japan | 63-292958 |
| Feb. 8, 1989 | [JP] | Japan | 1-29043 |
| Feb. 14, 1989 | [JP] | Japan | 1-34670 |
| Feb. 14, 1989 | [JP] | Japan | 1-34671 |
| Feb. 14, 1989 | [JP] | Japan | 1-34672 |

[51] Int. Cl.$^5$ .......................... B05D 1/18; B05D 1/38
[52] U.S. Cl. .......................... 427/299; 68/9; 68/18 C; 118/419; 118/429; 427/314; 427/434.2; 427/439
[58] Field of Search .............. 118/419, 420, 423, 424, 118/429; 68/9, 18 C; 427/299, 314, 434.2, 439, 443.2, 407.3

[56] References Cited

U.S. PATENT DOCUMENTS

| 1,595,236 | 8/1926 | Minton | 118/419 |
| 1,805,145 | 5/1931 | Koops | 118/420 |
| 2,876,131 | 3/1959 | Kumnick et al. | 427/434.2 |
| 2,956,613 | 10/1960 | Edelman et al. | 427/407.3 |
| 3,128,206 | 4/1964 | Dungler | 118/419 |
| 3,282,725 | 11/1966 | Van Zalinge | 427/434.2 |
| 3,981,162 | 9/1976 | Klier | 118/419 |

Primary Examiner—Michael G. Wityshyn
Attorney, Agent, or Firm—Griffin Branigan & Butler

[57] ABSTRACT

Apparatus is provided for carrying out a varnish impregnation method wherein a sheet-like base material is sequentially passed through a low-viscosity liquid storage region storing a low-viscosity liquid such as a solvent, a thermal syphon region, and a varnish storage region storing a varnish, the thermal syphon region being positioned between the low-viscosity liquid storage region and varnish storage region and communicating with both regions at air tight seals closed by liquid surfaces, and heating the base material in the thermal syphon region to vaporize the low-viscosity liquid impregnated in the base material. When the base material passes through the low-viscosity liquid, air contained in the base material is replaced with the low-viscosity liquid and discharged outside the apparatus. The low-viscosity liquid impregnated in the material is vaporized in the thermal syphon region. The base material containing only vapor of the low-viscosity liquid is transferred to the varnish storage region without being in contact with the atmosphere. The thermal syphon region has a base material inlet opening under or above the surface of the liquid in the low-viscosity liquid storage tank and a base material outlet opening under the surface of the liquid in the varnish storage tank. The thermal syphon region has a heating roll therein for heating the base material to thereby evaporate low-viscosity liquid impregnated in the base material.

10 Claims, 13 Drawing Sheets

F I G. 4
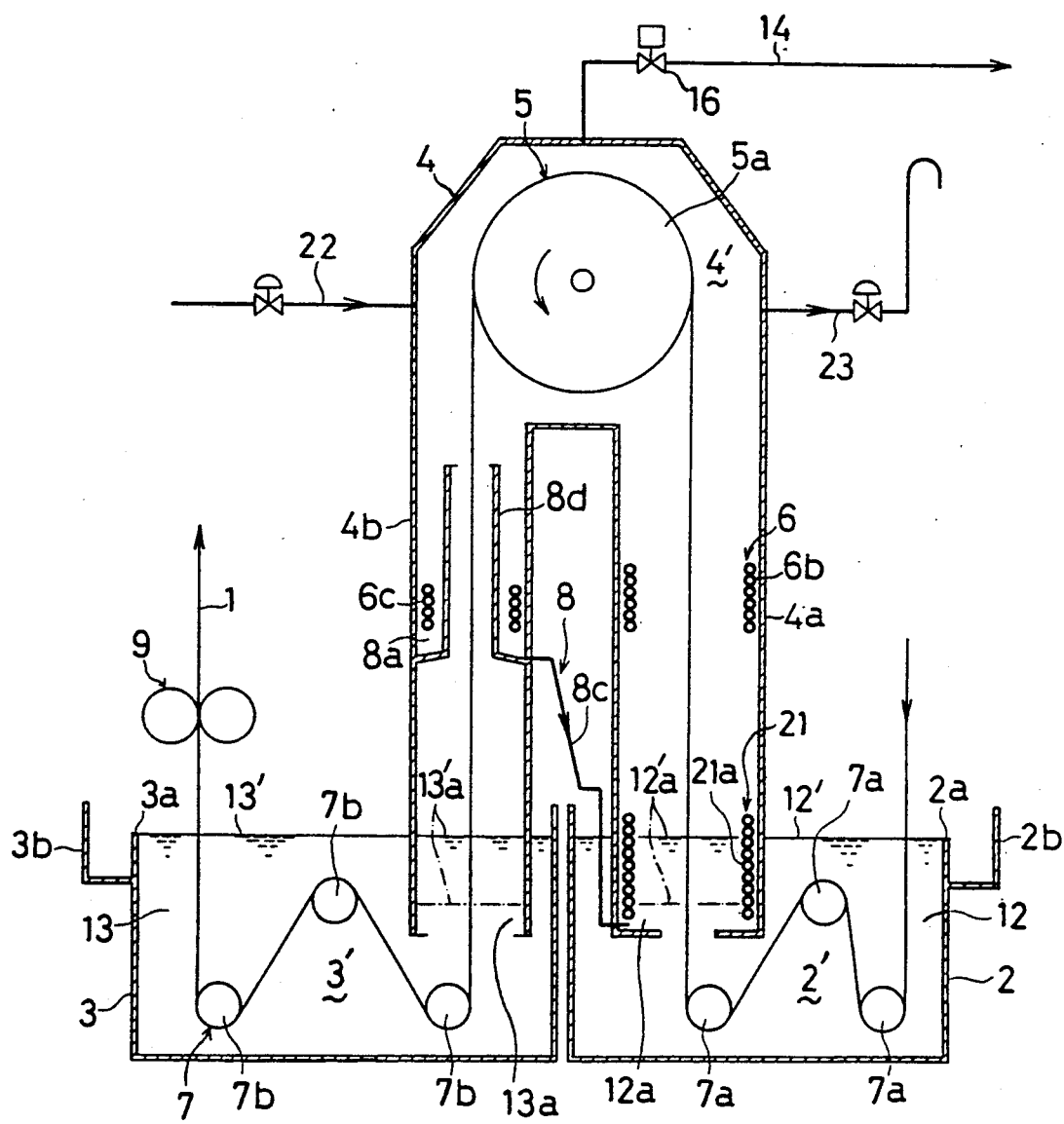

VARNISH IMPREGNATION METHOD

This is a division of application Ser. No. 07/430,329, filed Nov. 2, 1989 now U.S. Pat. No. 5,056,457.

FIELD OF THE INVENTION

The present invention relates to a varnish impregnation process and apparatus for sheet-like fibrous base materials such as paper or cloth to be used in the manufacture of laminated boards such as facing boards.

PRIOR ART

In effectively impregnating any sheet-like fibrous base material with varnish, it is essential not only for the varnish to be absorbed into and distributed evenly throughout the fibrous base material, but also for air bubbles contained in the base material to be eliminated to the greatest possible extent.

According to conventional varnish impregnation processes, however, it is common practice to impregnate the base material with ordinary varnish at a preliminary impregnation step, and then the base material is introduced by a timing roll into a varnish tank to be impregnated with the varnish. Such a conventional impregnation process, however, is known to have problems in that the varnish is not absorbed evenly and adequately into the base material, and the varnish takes too long to be absorbed. Such problems are especially conspicuous where a high-viscosity varnish is used.

Recently, however, an improved impregnation process has been developed utilizing a preliminary impregnation tank containing a solvent or a thin varnish containing a large amount of solvent (hereinafter referred to as "preliminary impregnation liquid") and a regular impregnation tank containing regular varnish. The base material is passed through the preliminary impregnation liquid tank and the regular impregnation tank containing the regular varnish by being guided with guiding rollers.

According to this impregnation process, air contained in the base material is removed by being replaced with the preliminary impregnation liquid while passing through the preliminary impregnation liquid, so that the varnish can be made to be absorbed effectively. The air bubbles can be reduced if the base material impregnated with the preliminary impregnation liquid is brought into the regular varnish while permitting the preliminary impregnation liquid to evaporate.

In the improved impregnation process, however, the base material is not only exposed to the air but also subjected to the pressure of the guide rolls while moving from the preliminary impregnation liquid tank to the varnish tank, so that neither satisfactory impregnation of the varnish nor the absence of air pockets can be expected. More particularly, when the base material is brought onto a guide roll, the contact surface pressure acts on the fiber bundles constituting the base material to open the fiber bundles, thereby destroying the liquid phase of the preliminary impregnation liquid maintained by capillary action in the fiber bundles. The fiber bundles are released from the compressive force acting thereon as the base material passes the guide rollers, and the fiber bundles, opened due to the compressive pressure, are formed into bundles again. Since destruction of the impregnation liquid phase and restoration of the fiber bundles take place in air, air re-enters the base material while the base material moves into the varnish from the preliminary impregnation liquid.

SUMMARY OF THE INVENTION

An object of the present invention is to provide a varnish impregnation process and apparatus which permits even and adequate impregnation of a base material with varnish, the impregnated base material having no air bubbles therein, thus ensuring high quality finished products such as electric insulating boards or facing boards in which the impregnated base material is used.

Another object of the present invention is to provide a varnish impregnation process and apparatus which enables a substantial reduction in &:he dimensions, and substantial simplification of the construction of, the apparatus without using a timing roll or the like.

Another object of the present invention is to provide a varnish impregnation process and apparatus which enables the quantity of low-viscosity liquid used in the base material to be reduced to ar extremely small amount. This permits a substantial reduction in the amount of vapor of the low-viscosity liquid exhausted from a drying furnace in a drying step following the impregnation process.

Another object of the present invention is to provide a varnish impregnation process and apparatus which enables the loss of the low-viscosity liquid and the thinning of the varnish to be effectively prevented and also enables the impregnation of a base material with varnish to be facilitated.

Another object of the present invention is to provide a varnish impregnation process and apparatus which enables the pressure of the vapor in a thermal syphon to be kept within a certain range irrespective of alterations or changes in the varnish impregnation conditions, such as base material feed speed, to insure satisfactory impregnation of a base material with a varnish.

Another object of the present invention is to provide a varnish impregnation process and apparatus which enables the vapor pressure in a thermal syphon region to be controlled more surely and accurately than the case where a pressure control device is employed, not only without using any high precision pressure control device at all, but also without requiring any further sophistication and extension of the device and its construction.

Another object of the present invention is to provide a process and apparatus which prevents undesirable conditions such as the low-viscosity liquid and the varnish being drawn into a thermal syphon room even when a vacuum or negative pressure is formed in the thermal syphon room.

In a varnish impregnation process and apparatus according to the present invention, a thermal syphon region, communicating with a varnish storage region in a liquid-sealed condition with the surface of the varnish, is provided between a low-viscosity liquid storage region containing a low-viscosity liquid such as a solvent, and a varnish storage region containing a varnish arranged such that a sheet-like base material may be passed through the low-viscosity liquid storage region, the thermal syphon region and the varnish storage region sequentially and the base material can be heated in the thermal syphon region to enable the low-viscosity liquid, absorbed in the base material, to be evaporated.

Within a region extending from the base material heater in the thermal syphon region to the varnish storage region, the base material is heated to, or kept at, a temperature that is higher than the temperature at which the vapor of the low-viscosity liquid starts to condense. The vapor of the low-viscosity liquid, produced in the thermal syphon region, is condensed and collected in liquid form. The thermal syphon region may communicate with the low-viscosity liquid storage region to form a liquid-seal at the surface of the liquid so that the low-viscosity liquid in the communicating region may be heated for evaporation, and the rate of evaporation can be controlled according to changes in the liquid-sealed level in the communicating region. In the thermal syphon region, it is desirable to enable the vapor of the low-viscosity liquid generated in said region to flow from the side of the base material outlet towards the inlet for the base material. The communicating region between the thermal syphon region and the varnish storage region, may be heated to, and kept at, a level that is higher than the temperature at which the low-viscosity liquid starts to boil.

Apparatus for practicing the above-mentioned process comprises a low-viscosity liquid storage tank containing a low-viscosity liquid such as a solvent, a varnish storage tank containing a varnish, a thermal syphon room with a base material inlet opening under or above the surface of the liquid in the low-viscosity liquid storage tank and a base material outlet opening under the surface of the liquid in the varnish storage tank, a guiding mechanism for enabling a sheet-like base material consisting of a fibrous material to pass sequentially through the low-viscosity storage tank, the thermal syphon room and the varnish storage tank, and a heater to heat the base material to evaporate the low-viscosity liquid absorbed in the base material.

The apparatus may be provided with a cooler to liquefy the vapor of the low-viscosity liquid by condensing and a liquid collector to collect the resulting liquid. Further, the apparatus may be provided with a condensation prevention means for heating to, or keeping the base material at, a temperature higher than that at which vapor of the low-viscosity liquid starts to condense. The condensation prevention means extends from a base material heater in the thermal syphon room to the end of an opening in the base material outlet and surrounds the path of the base material. Where the base material inlet is made to open under the surface of the liquid in the low-viscosity liquid storage tank, it is desirable to provide a low-viscosity liquid heating surface extending in the vertical direction and located in the base material inlet so that the heating surface will be able to function as a low-viscosity liquid heating mechanism which enables the evaporation rate of the low-viscosity liquid due to heating to be varied according to changes in the level of the liquid surface in the low-viscosity liquid storage region. Further, it is desirable to provide a low-viscosity liquid storage region and a low-viscosity liquid heater at the base material outlet, and it is also desirable to provide a vapor flowing mechanism which enables not only the low-viscosity liquid to be heated for evaporation, but also enables the vapor of the low-viscosity liquid generated in the thermal syphon room to flow from the side of the base material outlet towards the base material inlet. In this case, the low-viscosity liquid storage tank and the low-viscosity liquid storage region should communicate with each other. Further, it is desirable for the vapor flowage mechanism to be provided with a low-viscosity liquid collector communicating with the low-viscosity liquid storage region located at the base material inlet, and a cooler located at the low-viscosity liquid collector. In some embodiments the wall surrounding the thermal syphon room may have a jacket construction so that a heating medium can be supplied and flowed through the jacket. A heating device may be provided to heat the boundary of the varnish surface in the base material outlet to a temperature higher than the boiling point temperature of the low-viscosity liquid. The cross-sectional area of the base material passage in the base material outlet should be as small as possible while still permitting passage of the base material. A varnish impregnation quantity control device is provided to adjust the quantity of varnish contained in the base material after it has passed through the varnish storage tank. A vapor injection nozzle to supply vapor of the low-viscosity liquid into the thermal syphon room may be provided. In some embodiments the top of the low-viscosity liquid storage tank may be closed with a cover provided with a base material inlet, and the base material inlet may be provided with a cooler to prevent leakage of the vapor.

Other objects, features, aspects and advantages of the present invention will become apparent upon consideration of the following detailed description of the invention when taken in conjunction with the accompanying drawings.

BRIEF DESCRIPTION OF THE DRAWINGS

FIG. 4 is a sectional view showing a varnish impregnation apparatus according to a second embodiment of the invention;

DESCRIPTION OF A PREFERRED EMBODIMENT

Figure 1:
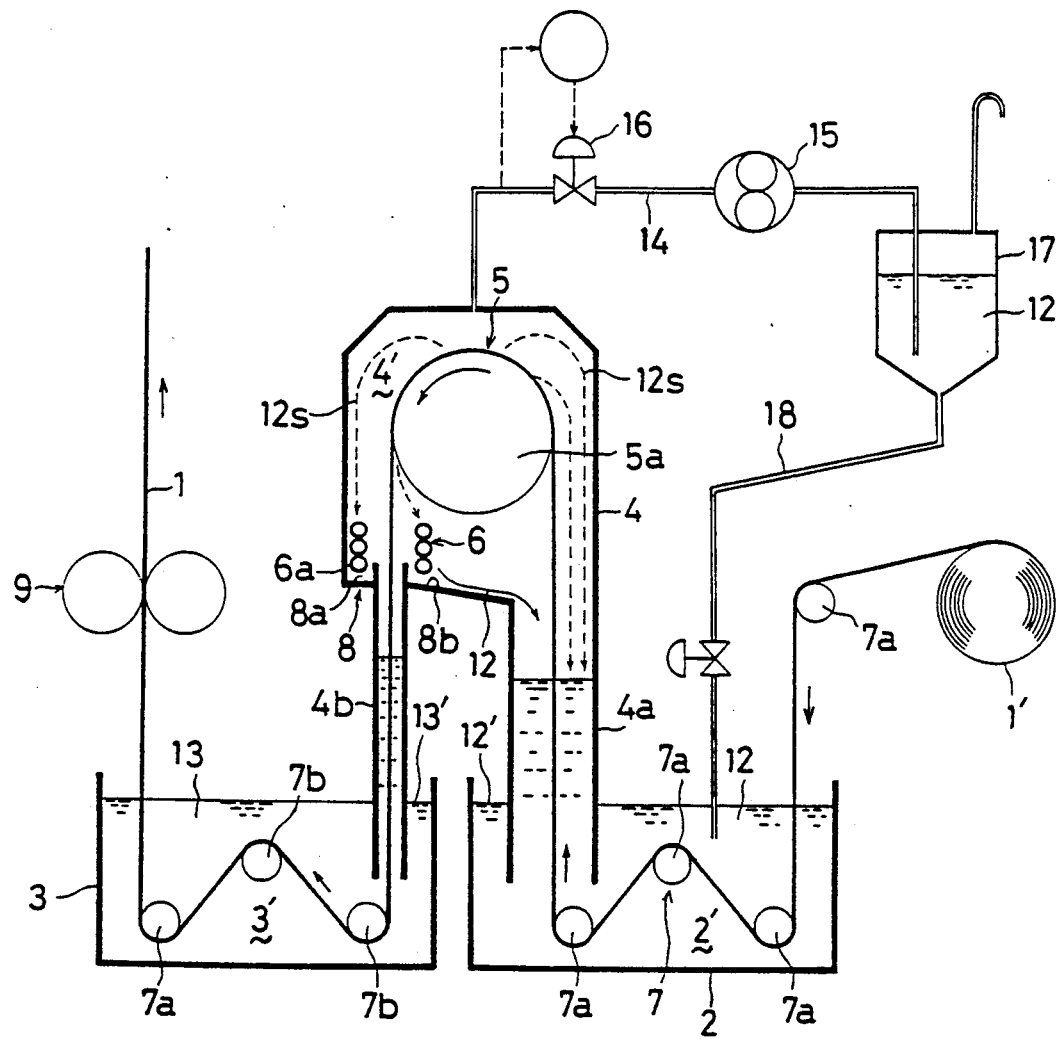
FIG. 1 is a sectional view showing a varnish impregnation apparatus according to a first embodiment of the invention.

FIG. 1 illustrates a first embodiment of the invention wherein a varnish impregnation system comprises an open-top low-viscosity liquid storage tank 2 containing a predetermined quantity of low-viscosity liquid 12 such as a solvent, an open-top varnish storage tank 3 containing a predetermined quantity of varnish 13, a thermal syphon room 4 located between the two storage tanks 2 and 3, a base material heater 5 to heat the base material 1 in the thermal syphon room 4, a cooling device 6 to condense and liquefy the vapor of the low-viscosity liquid, a guiding device 7 to guide or transport the run of the base material 1 along a predetermined course, a condensate collector 8 to collect the condensate of the low-viscosity liquid 12 and a varnish impregnation control device 9.

The base material 1 is in a sheet-like form and comprises fibrous materials such as woven cloth or non-woven cloth made of synthetic or natural and organic or inorganic fibers.

The low-viscosity liquid 12 should have an adequate wettability to the base material 1. For example, the solvent should be one whose viscosity is lower than that of the varnish 13 or lower than 100cP, but such a solvent should preferably have the same properties as those of the solvent mixed with the varnish so that there will be no problem even when the solvent is mixed with the varnish 13. The low-viscosity liquid 12 is kept at a predetermined temperature $T_s$ by a temperature controller and heater (not shown) of conventional design.

It is preferred that the varnish 13, be a thermosetting resin varnish although other varnishes, such as thermoplastic resin and natural resins, or liquid synthetic resins and liquid natural resins not containing the solvent may also be used. A temperature controlled heater (not shown) keeps varnish 13 at a predetermined temperature $T_w$ that is higher than the temperature $T_s$ of the low-viscosity liquid.

The thermal syphon room 4 is disposed above the storage tanks 2 and 3 and formed into a reverse U-shaped syphon tube with an inlet 4a through which the base material enters from storage tank 2 and an outlet 4b through which the base material exits into storage tank 3. The inlet 4a and the outlet 4b open under the liquid surface 12' of the low-viscosity liquid storage region 2' and the liquid surface 13' of the varnish storage region 3', respectively, to form a liquid-sealed thermal syphon region 4' in the thermal syphon room 4. The base material inlet 4a has a relatively large cross-sectional area to secure a large condensation area for the saturated vapor of the low-viscosity liquid, whereas the base material outlet 4b has a relatively small cross-sectional area to provide a relatively small evaporation area for the saturated vapor of the low-viscosity liquid. The wall surrounding the thermal syphon room 4, including the base material inlet 4a and the base material outlet 4b, comprises a heat insulator so as to prevent the vapor of the low-viscosity liquid from being cooled by outside air, thus reducing condensation of the vapor on the internal surface of the wall.

The thermal syphon room 4 is connected to an exhaust pump 15 through a bleeding tube 14 and a pressure regulating valve 16. This not only permits air in the thermal syphon region 4' to be eliminated but also permits the pressure of the region 4' to be controlled. The pump 15 is connected to a separator 17 so that the vapor 12s of the low-viscosity liquid, contained in the air exhausted through bleeding tube 14, can be separated and collected in the form of the saturated liquid 12 and returned to the low-viscosity liquid storage tank 2 through a collecting tube 18.

The base material heating device 5 comprises a heating roll 5a installed rotatably in the thermal syphon room 4 so as to be able to follow the circular run of the base material 1. In the thermal syphon region 4', the heating roll 5a heats the base material 1 to a temperature higher than, or approximating the boiling point temperature of the low-viscosity liquid 12, to evaporate the low-viscosity liquid 12 absorbed in the base material. The heating roll 5a may be driven to rotate in the direction of movement of the base material 1. If the heating roll is driven, it is necessary to provide suitable means for adjusting its circumferential speed to the speed of the base material 1.

The temperature $T_h$ ($<T_w$) to which the base material is heated by the heating roll 5a is controlled by a temperature controller (not shown). The evaporating ability of the heating roll should be large enough to evaporate from the base material 1 the largest quantity of low-viscosity liquid brought into thermal syphon room 4 by the base material.

The cooling device 6 comprises a cooling coil 6a located at the top end of the base material outlet 4b in the thermal syphon room 4. The cooling coil 6a liquefies or condenses the vapor 12s of the low-viscosity liquid produced in the thermal syphon region 4' to provide the effective thermal syphon action. The cooling coil also prevents, to the largest extent possible, condensation of vapor 12s in the varnish storage region 3'. The cooling coil is maintained at a temperature $t_c$ which is lower than the temperature $T_s$ of the low-viscosity liquid.

The guiding device 7 comprises a plurality of guide rolls 7a and 7b installed above low-viscosity liquid storage tank 2 and in the storage tanks 2 and 3 so that the base material 1 from a base material supply source 1' can be guided through the low-viscosity storage region 2' into the thermal syphon region 4' where it passes over heating roll 5a. The base material is then guided through cooling coil 6a, base material outlet 4b and varnish storage region 3' from whence it passes through the varnish impregnation control device 9. At least one of the guide rolls 7a and 7b disposed in each of the storage regions 2' and 3' is of the expander type so that an expanding force can be applied in the lateral direction, orthogonal to the direction of advancement of the base material 1. This facilitates replacement of air in the base material with the low-viscosity liquid in the storage region 2' and impregnation of the base material with varnish in the varnish storage region 3'.

The condensate collection device 8 comprises a condensate pool 8a formed at the bottom of the thermal syphon room 4 and immediately below the cooling coil 6a, and a downwardly inclined member 8b for down flow of the condensate into storage tank 2.

The varnish impregnation control device 9 comprises a squeeze roll or a squeeze bar disposed above storage tank 3 for squeezing excess varnish from the base material as it emerges from the varnish storage tank 3.

Figure 2A:
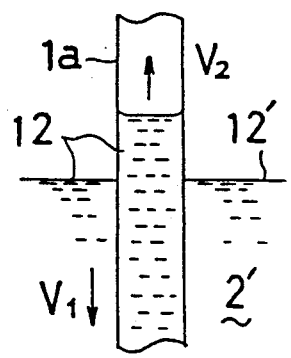
FIGS. 2A and 2B illustrate low-viscosity liquid levels resulting from changes in vapor pressure in the thermal syphon room.
Figure 2B:
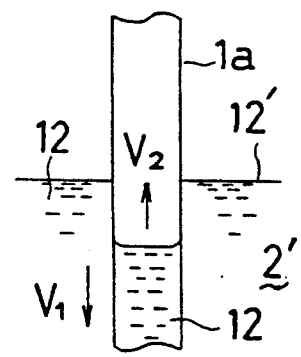

The varnish impregnation system described above operates as follows to carry out the process according to the present invention. Firstly, the base material 1 from the base material supply source 1' is brought into the storage tank 2 where it is immersed in the low-viscosity liquid 12, so that air in the base material 1 is replaced with the low-viscosity liquid. That is, when the base material 1 reaches the surface 12' of the low-viscosity liquid 12, the low viscosity liquid 12 permeates into the fiber bundles 1a (FIG. 2A) of the base material due to capillary action. Simultaneously, air in the fiber bundles is forced out due to the osmotic pressure of the liquid. Such an osmotic action, however, stops at a certain level due to the osmotic resistance of the fiber bundles 1a. The stop of the osmotic action occurs above or below the liquid surface 12' depending on whether the traveling speed ($V_1$) at which the fiber bundles 1a enter the low-viscosity liquid 12 is larger or smaller than the osmotic speed $V_2$. FIG. 2A illustrates the condition where $V_1 > V_2$ while FIG. 2B illustrates the condition where $V_1 < V$.

As the base material 1 passes through the low-viscosity liquid storage region 2', all the air in the fiber bundles 1a is replaced with the low-viscosity liquid 12. The expander type guide roll 7a facilitates the replacement by forcing the air from the fiber bundles.

Next, the base material 1, impregnated with the low-viscosity liquid 12, is fed into the thermal syphon room 4, passing through the base material inlet 4a opening under the liquid surface 12'. In the thermal syphon room the base material is heated by heating roll 5a to remove by evaporation the low-viscosity liquid 12 contained in the base material 1.

In such a system as described above, the base material 1 continues to supply low-viscosity liquid 12 to the base material heating device 5a, so that the base material serves as the wick of a thermal syphon. On the other hand, the thermal syphon room 4 can be filled with saturated vapor of the low-viscosity liquid after air therein is discharged by the exhaust pump 15.

Also, since the base material heating region temperature Th is greater than the low-viscosity liquid temperature Ts which in turn is greater than the cooling coil temperature Tc, the vapor pressure of the low-viscosity liquid 12 will tend to be different in various parts in the thermal syphon region 4'. The vapor pressure Ph in the base material heating device is greater than the vapor pressure Pw on the surface of the varnish, which is greater than the vapor pressure Ps on the surface of the low-viscosity liquid, which is greater than the vapor pressure Pc in the cooling coil region. The low-viscosity liquid vapor 12s moves at sonic speed due to this pressure gradient, so that most of the vapor is collected into the low-viscosity liquid storage tank 2 from the base material heating region 5a without allowing the vapor to enter into the varnish storage tank 3. That is, the low-viscosity liquid vapor 12s produced in the base material heating region is returned to the low-viscosity liquid storage tank 2 from the thermal syphon room 4 by way of the base material inlet 4a, or liquified by the cooling coil 6a to be returned to the low-viscosity liquid storage tank 2 from the condensate tank 8 by way of the down-flow member 8b as shown in FIG. 1.

The base material 1, after being heated in the thermal syphon room 4, contains only the saturated vapor 12s of the low-viscosity liquid. Since the base material 1 enters into the varnish storage region 3' through the liquid-sealed region of the base material outlet 4b without being exposed to the air, there is no chance for air to enter into the base material 1 while the base material 1 moves from the thermal syphon region 4' to the varnish storage region 3'.

Furthermore the saturated vapor 12s of the low-viscosity liquid contained in the base material 1 changes into a trace of low-viscosity saturated liquid and diffuses into the varnish 13 when the base material enters into the varnish storage region 4'. The base material 1 can thus be impregnated evenly and adequately with the varnish 13 while the base material passes through the varnish storage region. Also, since most of the low-viscosity liquid vapor 12s generated in the thermal syphon room 4 is collected into the low-viscosity liquid storage tank 2, and only an extremely small quantity of the saturated vapor is brought into the varnish storage tank by the base material 1, the viscosity of the varnish in the varnish storage tank 3 is scarcely affected.

The expander type guide rolls 7a and 7b cause a stretching force to act in the lateral direction in the base material as the base material passes over the rolls, and this stretching force ends after the base material has passed the rolls, so that the fiber bundles in the base material are stretched and then contracted laterally in the low-viscosity liquid 12 and the varnish 13, whereby the replacement of air with the low-viscosity liquid and impregnation of the fiber bundles with the varnish is more efficiently accomplished. As a result, the varnish 13 is adequately absorbed into the fiber bundles of the base material 1.

Figure 3:
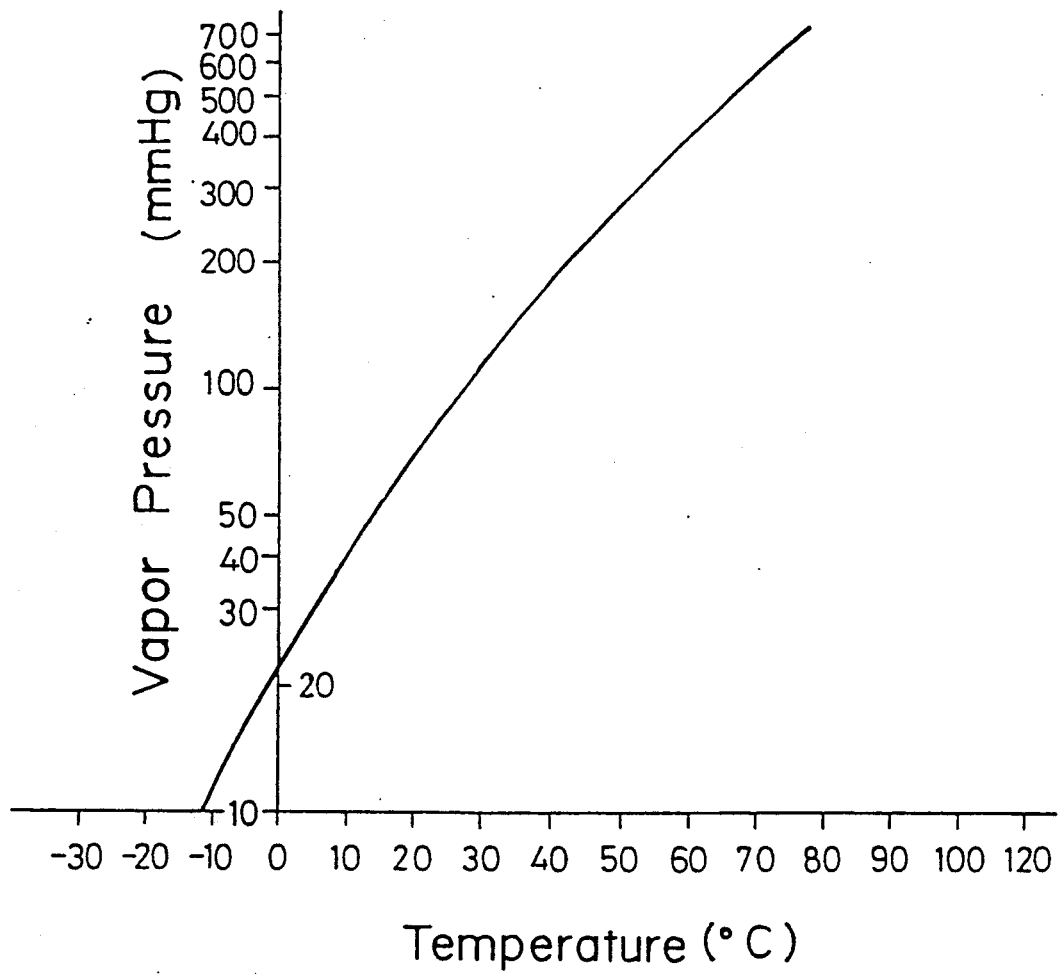
FIG. 3 is a temperature vs. vapor pressure diagram of methyl ethyl ketone, used as a low-viscosity liquid.

The present inventor conducted an experimental operation of the varnish impregnation system described above using glass fiber cloths #7628 for electronic base material as the base material 1. The varnish 13 had the composition shown in Table I. Methyl ethyl ketone, the solvent of the varnish 13, was employed as the low-viscosity liquid 12. The temperature conditions were: Th = 150° C., Tw = 30° C., Ts = 20° and Tc = 10° C. The result of this experimental operation of the system indicates that the system is capable of not only controlling the quantity of the low-viscosity liquid brought into the varnish storage tank 3 to an extremely low level (10% by volume, 0.0128% by weight) without causing any adverse effects such as a drop in the viscosity of the varnish in the varnish storage tank, but also impregnating the base material 1 evenly and adequately with varnish without leaving air bubbles in the base material 1. The temperature vs. vapor pressure diagram of the methyl ethyl ketone used as the low-viscosity liquid 12 is shown in FIG. 3.

Composition of the Varnish

TABLE I

| Composition of the Varnish | | |
|---|---|---|
| Viscous liquid | Epoxy resin | 100 parts |
| Solvent | Methyl ethyl ketone | 25 |
|  | Methylene glycol | 20 |
|  | Dimethylformamide | 15 |
| Setting Agent | Dicyandiamide | 3.5 |
| Accelerator | Imidazole | 0.1 |

FIG. 4 shows a second embodiment of the present invention. In this embodiment, the varnish impregnation system comprises a low-viscosity liquid storage tank 2, a varnish storage tank 3, a thermal syphon room 4, a base material heating device 5, a cooling device 6, a guide device 7, a varnish impregnation control device 9 and a low-viscosity liquid heating device 21.

The side wall of the storage tanks 2 and 3 are provided with overflow dams 2a and 3a and overflow pools 2b and 3b respectively, so that the level of the liquid in each of the storage tanks 2 and 3 can be kept constant at the level of the storage dams. The overflow pools 2b and 3b are designed so that liquid in the pools can be returned to the storage tanks 2 and 3 by return devices of conventional design (not shown).

The thermal syphon room 4 is connected to a bleeding tube 14, an inert gas supply tube 22 and an exhaust tube 23.

The cooling device 6 comprises a primary cooling coil 6b located in the base material inlet 4a and above the low-viscosity liquid storage region 12a, and a secondary cooling coil 6c located in the base material outlet 4b above the varnish storage region 13a. The cooling capacity or the condensing capacity of the primary cooling coil 6b should be large enough to condense all of the vapor of the low-viscosity liquid produced when the base material 1 is heated by the heating roll 5a. That is, the cooling capacity or condensing capacity of coil 6b should be larger than the liquid evaporating capacity of heating roll 5a. On the other hand, the condensing capacity of the secondary cooling coil 6c should be lower than that of, or within, 10 to 20% of the capacity of the primary cooling coil 6b. The space between each of cooling coils 6b and 6c and the wall of the room 4 is heat-insulated so that vapor of the low-viscosity liquid will not condense on the wall as might otherwise occur if the wall were cooled by the coils.

A low-viscosity liquid heating device 21 is provided to heat and thereby cause evaporation of the low-viscosity liquid in the low-viscosity liquid storage region 12a. Heating device 21 comprises a coil 21a through which a heating medium may be circulated from a source not shown. The heating capacity of the heating device 21 must be large enough to at least ensure that the quantity of low-viscosity liquid vaporized is equal to the quantity (aggregate) condensed by the cooling coils 6b and 6c. The space between the coil 21a and the wall of the thermal syphon room 4 is heat-insulated to prevent, as far as possible, the transmission of heat from the region 12a to the wall.

A condensate collection device 8 comprises a wall 8d attached to the interior wall of the base material outlet 4b immediately below the secondary cooling coil 6c, and a collecting tube 8c through which the collected condensate may flow to the low-viscosity liquid storage tank 2 or, more specifically, to the low-viscosity storage region 12a. This permits the vapor condensed by the primary cooling coil 6c to be collected into the low-viscosity liquid storage area 12a. The vapor of the low-viscosity liquid condensed by the primary cooling coil 6b is collected into the storage region 12a because it falls, under gravity, through the base material inlet 4a. The wall 8d also serves as a heat-insulating wall between the base material 1 and the secondary cooling coil 6c so that the condensate of the vapor of the low-viscosity liquid, formed when the base material is cooled by the cooling coil 6c, can be prevented from depositing on the base material 1.

Except as described above, the elements of FIG. 4 correspond to elements of FIG. 1, previously described.

When starting the system illustrated in FIG. 4, the thermal syphon room 4 should be filled with the saturated vapor of the low-viscosity liquid by the procedure described below, and the vapor pressure therein should be kept within a predetermined range.

Firstly, inert gas is supplied to the thermal syphon room 4 through supply tube 22 to exhaust air from room 4 through exhaust tube 23. During this time, the internal pressure of the thermal syphon room 4 is kept at atmospheric pressure. The liquid levels in the low-viscosity liquid storage regions 12a and 13a are thus equal to the liquid levels 12' and 13' of the storage tanks 2 and 3 as indicated by the solid lines at 12'a and 13'a. After the room 4 is filled with inert gas, the flow of inert gas is terminated.

The heating devices 5 and 21 are then actuated to generate vapor of the low-viscosity liquid in the thermal syphon room 4, this vaporization taking place primarily as a result of the heat produced by heating device 21. Simultaneously, only the secondary cooling coil 6c, responsible for the partial secondary cooling capacity of the system, is actuated to condense the vapor of the low-viscosity liquid. Since the primary cooling coil 6b having a higher cooling capacity is left unactuated, the rate of vaporization by the two heating devices 5 and 21 surpasses the rate of condensation by the secondary cooling coil 6c, thus causing an increase in the vapor pressure in the thermal syphon room 4.

As the vapor pressure in room 4 increases, the bleeding valve 16 in bleeding tube 14 is opened and the excess vapor, with inert gas, in the thermal syphon room 4 is discharged into the low-viscosity liquid storage tank 2 through the bleeding tube 14 to maintain the internal pressure of the room 4 at atmospheric pressure. The liquid levels 12'a and 13'a remain unchanged at the levels indicated by solid lines in FIG. 4. The condensate of the vapor of the low-viscosity liquid resulting from the condensation by the secondary cooling 6c is collected into the condensate pool 8a and flows back into the low-viscosity liquid storage section 12a through collection tube 8c. This prevents the condensed vapor of the low-viscosity from falling into the vanish storage region 3'.

Heating by heating devices 5 and 21 is continued with valve 16 open until the inert gas in thermal syphon room 4 has been discharged and room 4 contains only the vapor of the low-viscosity liquid. The valve 16 is then closed.

When valve 16 is closed, continued heating causes the internal pressure of the room 4 to increase. As the internal pressure of room 4 rises, the liquid sealed levels 12'a and 13'a fall to the levels indicated by the dotted lines in FIG. 4. As the liquid level 12'a of the low-viscosity liquid pool 12a falls, the depth of immersion of the low-viscosity liquid heating coil 21a in the pool 12a, and consequently the contact area between the heating coil and the low-viscosity liquid decreases. This causes a decrease in the rate of evaporation due to the low-viscosity liquid heating device 21 and establishes equilibrium between the evaporation rate and the condensation rate of the secondary cooling coil 6c.

Subsequently, when the primary cooling coil 6b is actuated, the condensation rate of the low-viscosity liquid vapor increases whereas the internal pressure of the thermal syphon room 4 decreases thereby causing the liquid-sealed levels 12'a and 13'a to rise. As the liquid level 12'a rises, the contact area between the heating coil 21a and the low-viscosity liquid increases to thereby increase the evaporation rate by the heating device 21. Equilibrium is thus established between the evaporation rate and the condensation rate determined by cooling coils 6b and 6c so that the internal vapor pressure of the thermal syphon room 4 is maintained within a predetermined range.

Under the above-described condition, the base material 1 can be impregnated with varnish in the same manner as that of the FIG. 1 embodiment by feeding the base material 1 through the impregnation system.

The internal vapor pressure of the thermal syphon room 4 can be maintained constant insofar as the evaporation rate of the low-viscosity liquid 12 due to heating devices 5 and 21, and the condensation rate due to the cooling devices 6b and 6c, is concerned. However, a change in varnish impregnation conditions, such as a change in the feeding speed of the base material, upsets equilibrium between the evaporation rate and the condensation rate, resulting in fluctuation of the internal vapor pressure in the thermal syphon room 4. The apparatus of FIG. 4 is capable of re-establishing equilibrium after occurrence of an upset condition.

Any change in the internal vapor pressure of the thermal syphon room 4 is accompanied by a change in the liquid level 12′a of the low-viscosity liquid pool 12a and the liquid level 13′a of the varnish pool 13a. The evaporation rate due to the low-viscosity liquid heating device 21 is thus controlled automatically depending on changes in the liquid levels. That is, when the liquid level 12′a of the low-viscosity liquid pool 12a rises due to a fall of the vapor pressure, the contact area between the low-viscosity liquid and the low-viscosity liquid heating coil 21a increases, as indicated by the solid line in FIG. 4. As a result, the rate of evaporation increases in an amount corresponding to the drop of the vapor pressure to prevent the drop of the internal pressure in the thermal syphon room 4. On the other hand, a rise of the vapor pressure causes the liquid level 12′a to drop, resulting in a decrease in the contact area between the low-viscosity liquid 12a and the low-viscosity liquid heating coil 21a as indicated by the dotted line in FIG. 4. As a result, the rate of evaporation due to the low-viscosity liquid heating device 21 decreases to limit the rise of the vapor pressure in room 4.

As described in the above, the internal vapor pressure of the thermal syphon room 4 can be self-controlled to remain within a certain range even without a pressure controller. In the case of a conventional system, a stop of the operating of the system and the resulting stop of the feed of the base material, or a change in an operating condition such as the alteration or change of the base material feeding speed, may cause the condensation rate due to the cooling device 6 to largely surpass the evaporation rate due to the heating of the base material to thus form a vacuum or negative pressure in the thermal syphon room 4. This may cause adverse effects such as the low-viscosity liquid 12 and the varnish 13 being drawn up into the thermal syphon room 4 through the base material inlet 4a and the base material outlet 4b. The system according to the present invention, however, is free of such problems.

Figure 5:
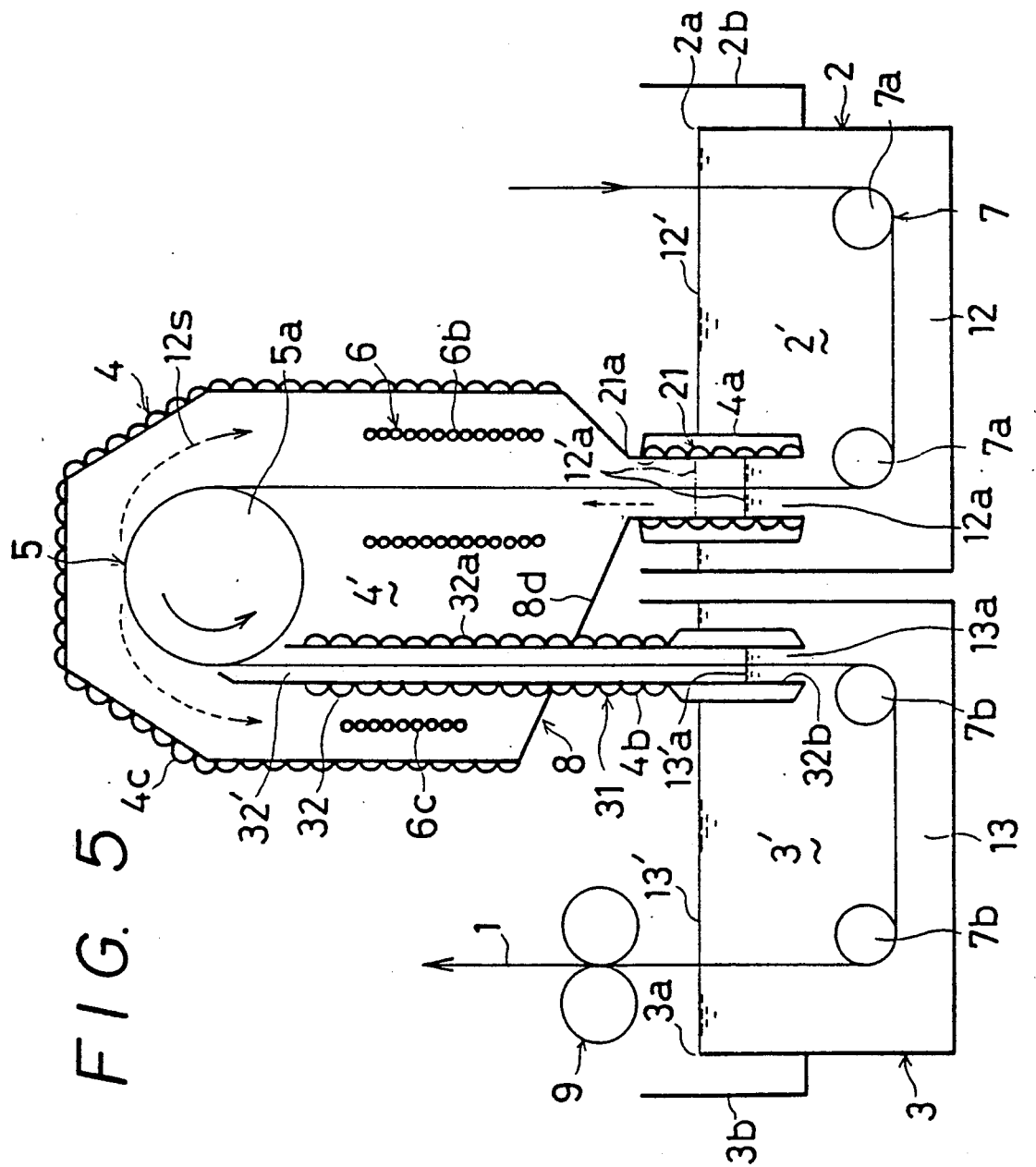
FIG. 5 is a sectional view showing a varnish impregnation apparatus according to a third embodiment of the invention.

FIG. 5 shows a third embodiment of the invention. The varnish impregnation system represented by this embodiment comprises a low-viscosity liquid storage tank 2, a varnish storage tank 3, a thermal syphon room 4, a base material heating device 5, a cooling device 6, a guiding device 7, a condensate collection device 8, a varnish impregnation control device 9, a low-viscosity liquid heating device 21 and a condensation prevention device 31.

The wall of the thermal syphon room 4 is provided with a jacket 4c except on the bottom wall which is a down-flow plane 8d. An appropriate heating medium is supplied to the jacket from a suitable source (not shown) to heat and maintain the low-viscosity liquid in room 4 at a temperature higher than that of the boiling point of the low-viscosity liquid. The jacket enables the internal pressure of the thermal syphon room 4 to be quickly raised to the saturated vapor pressure of the low-viscosity liquid 12. At system start up, this quick rise can be accomplished without causing condensate of the vapor 12s of the low-viscosity liquid to deposit on the internal surface of the wall 4c. The external and bottom walls of the jacket are formed of a heat-insulating material.

The condensation prevention device 31 comprises a base material passage cylinder 32 which surrounds a base material passage region 32′ extending from the vicinity of the heating roll 5a to the varnish pool 13a. The lower end of the base material passage cylinder 32 serves as the base material outlet 4b, and the wall of the outlet forms the heating walls 32a and 32b having a jacket construction. The heating walls 32a and 32b are designed to permit a heating medium to flow therein whenever necessary in order to heat the base material 1 to a temperature higher than the condensation temperature of the low-viscosity liquid vapor 12s in the base material passage cylinder and the base material passage region 32′. This system is especially characterized by being designed so that a heating medium of a higher temperature is supplied to and flowed through the lower heating wall 32b surrounding the varnish pool 13a so as to heat the liquid surface 13′ of the varnish in varnish pool 13 to a temperature higher than the boiling-point temperature of the low-viscosity liquid 12. Similarly, the same heating medium supply and flow system may be applied to the upper heating wall 32a. In this case, however, the two heating walls 32a and 32b may be formed into a continuous jacket construction.

The external walls of the jackets of the heating walls 32a and 32b are formed of heat insulating material so that heat in the base material passage cylinder 32 is not transmitted outside. More specifically, the heat-insulating walls are provided to prevent such adverse effects as a lowering of the cooling effect of the cooling device 6 and a rise in the temperature of the varnish 13 around the varnish pool 13a. Also, it is desirable for the upper end of the base material passage cylinder 32 to be located as close as possible to the heating roll 5a.

The embodiment of FIG. 5 is similar in many respects to previously described embodiment hence all of its elements are not described. However, it is noted that the condensate collection device 8 may be like that shown in FIG. 1.

In FIG. 5, the base material 1 passes over the heating roll 5a, enters the base material passage cylinder 32, and moves into the varnish pool 13a. The inside of the base material cylinder 32 is heated to, and maintained at, a temperature higher than the condensation temperature of the low-viscosity liquid vapor 12s by flowing a heating medium through walls 32a and 32b. The base material passage region 32′ extending from the heating roll 5a to the varnish pool 13a is thus thoroughly filled with the vapor of the low-viscosity liquid 12s, and the low-viscosity liquid vapor in the base material passage region 32′ is prevented from condensing on the surface of the base material or entering into the varnish pool 13a as might otherwise occur due to the effect of the radiational cooling of the cooling device 6.

In general, the varnish temperature is lower than that of the saturated vapor of the low-viscosity liquid, so the low-viscosity liquid vapor 12s contained in the base material would normally condense when the base material 1 enters into the varnish 13. However, the liquid surface 13a' of the varnish pool 13a is heated to a temperature higher than the boiling point temperature of the low-viscosity liquid 12 by the lower heating wall 32b, so that the condensate generated when the base material enters into the varnish 13 is re-evaporated so that practically no vapor enters the varnish 13. The varnish 13 thus remains undiluted by the low-viscosity liquid.

Figure 6:
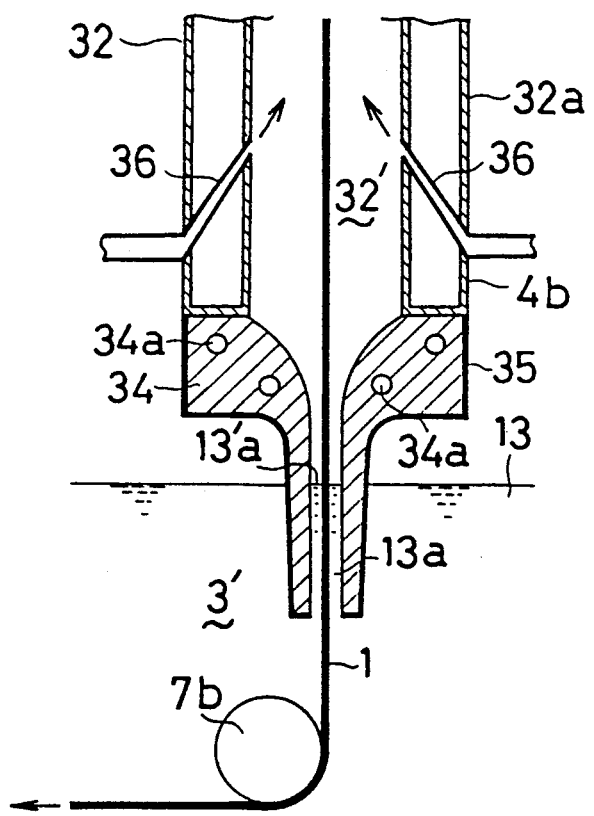
FIG. 6 is a sectional view of a base material outlet extending below the level of varnish in a varnish tank.

In the varnish impregnation system of FIG. 5, the heating walls 32a and 32b may be formed simply as heat-insulating walls which prevent the base material 1 passing the base material passage cylinder 32 from being subjected to the radiational cooling effect of the cooling device 6, while at the same time permitting the temperature of the base material 1 and the ambient temperature within the region extending from the heating roll 5a to the varnish pool 13a to be maintained at a temperature higher than the condensation temperature of the low-viscosity liquid 12. Also, the heating wall 32a need not necessarily be cylindrical in form to surround the base material completely but may take the form of two opposite walls facing the sides of the descending base material. Further, the heating means at the varnish pool 13a is not necessarily limited to the heating wall 32b with jacket construction but may take any other conventional form.

Where there is a possibility that the vapor of the solvent contained in the varnish 13 might enter into the thermal syphon room 4 when the varnish pool 13a is heated, the base material outlet 4b should have the smallest possible cross-sectional area consonant with free passage of the base material so that the area of the boundary between the varnish storage region 3' and the thermal syphon region 4' is kept to a minimum. For example, as shown in FIG. 6, part of the outlet 4b, that is, the heating wall 32b, should be formed with a metal nozzle 34. The nozzle 34 is provided with a fluid conduit 34a through which a heating medium may flow to heat the varnish pool 13a to a temperature higher than the boiling point temperature of the low-viscosity liquid 12. It is desirable that the external surface of the nozzle 34 be provided with a heat-insulating layer 35 to prevent the surrounding varnish 13 from being heated.

The arrangement shown in FIG. 6 prevents, to the greatest possible extent, the evaporation of the solvent in the varnish 13 due to heating of the varnish pool 13a, and entry of the vapor into the thermal syphon room 4. Furthermore, condensation of the low-viscosity liquid vapor 12s at the liquid surface 13a' of the varnish pool 13a can be reduced.

As illustrated in FIG. 6, the surrounding wall of the thermal syphon room 4 or, more particularly, the base material outlet 4b, may be provided with a plurality of vapor injection nozzles 36 for injecting low-viscosity liquid vapor 12s into the thermal syphon room 4. This arrangement, coupled with the aforementioned heating by the surrounding wall 4c of the thermal syphon room 4, permits a quick rise in vapor pressure to be realized at the start of the operation.

Figure 7:
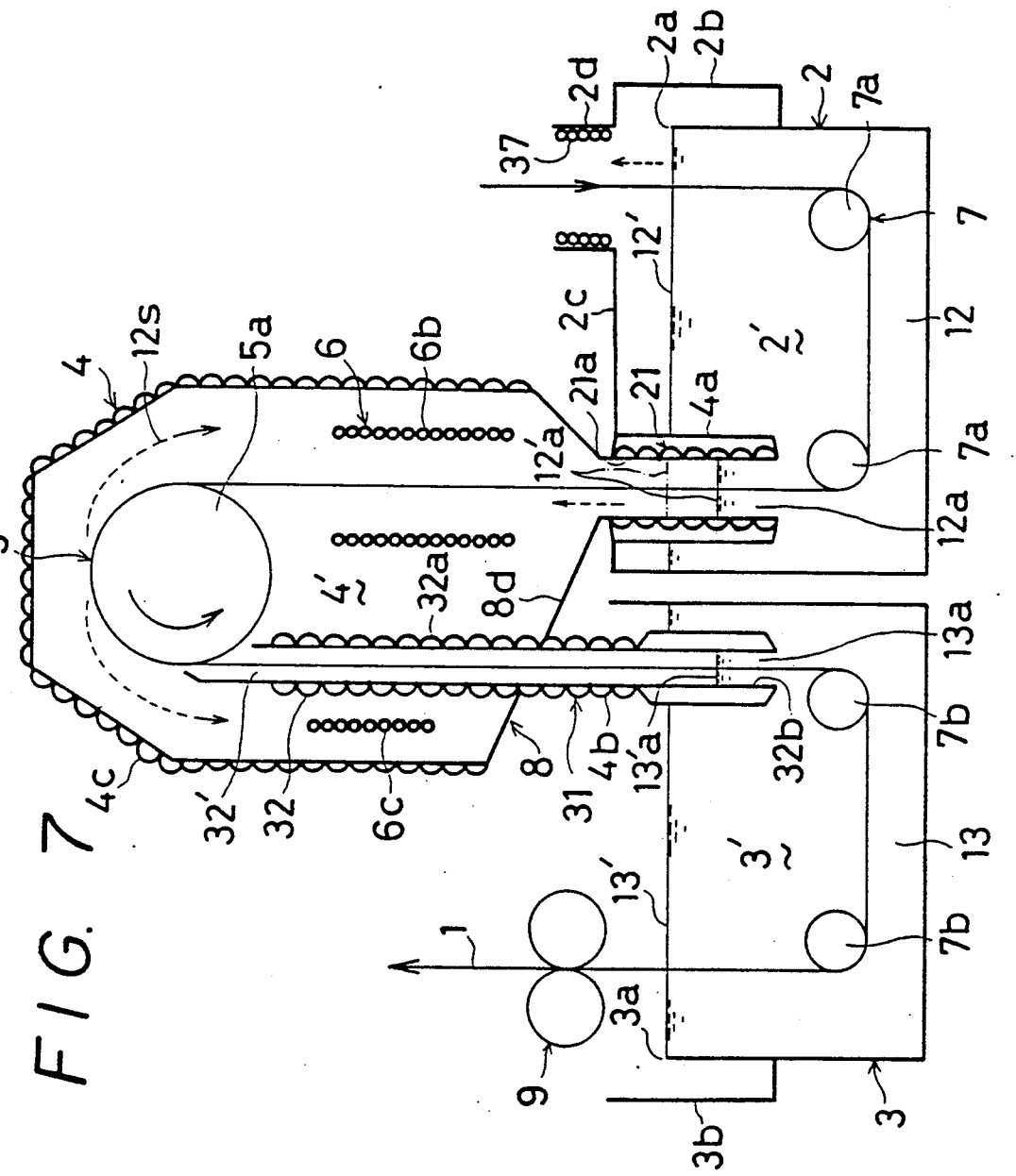
FIG. 7 is a sectional view of a varnish impregnation apparatus wherein the thermal syphon room is provided with a jacket construction.

Further, as shown in FIG. 7, the open top of the low-viscosity liquid storage tank 2 may be closed with a cover 2c that is provided with an inlet 2d for entry of the base material 1. The inlet 2d may be provided with a collar 37 comprising, for example, a cooling coil in order to prevent leakage of the vapor. At the inlet 2d, the low-viscosity liquid vapor 12s is condensed or liquefied by a cooling coil 37. Thus, the diffusion of the vapor of the low-viscosity liquid is prevented, thereby reducing environmental pollution and permitting the use of a flammable liquid as the low-viscosity liquid 12. A similar arrangement may be provided for the varnish storage tank 3.

Figure 8:
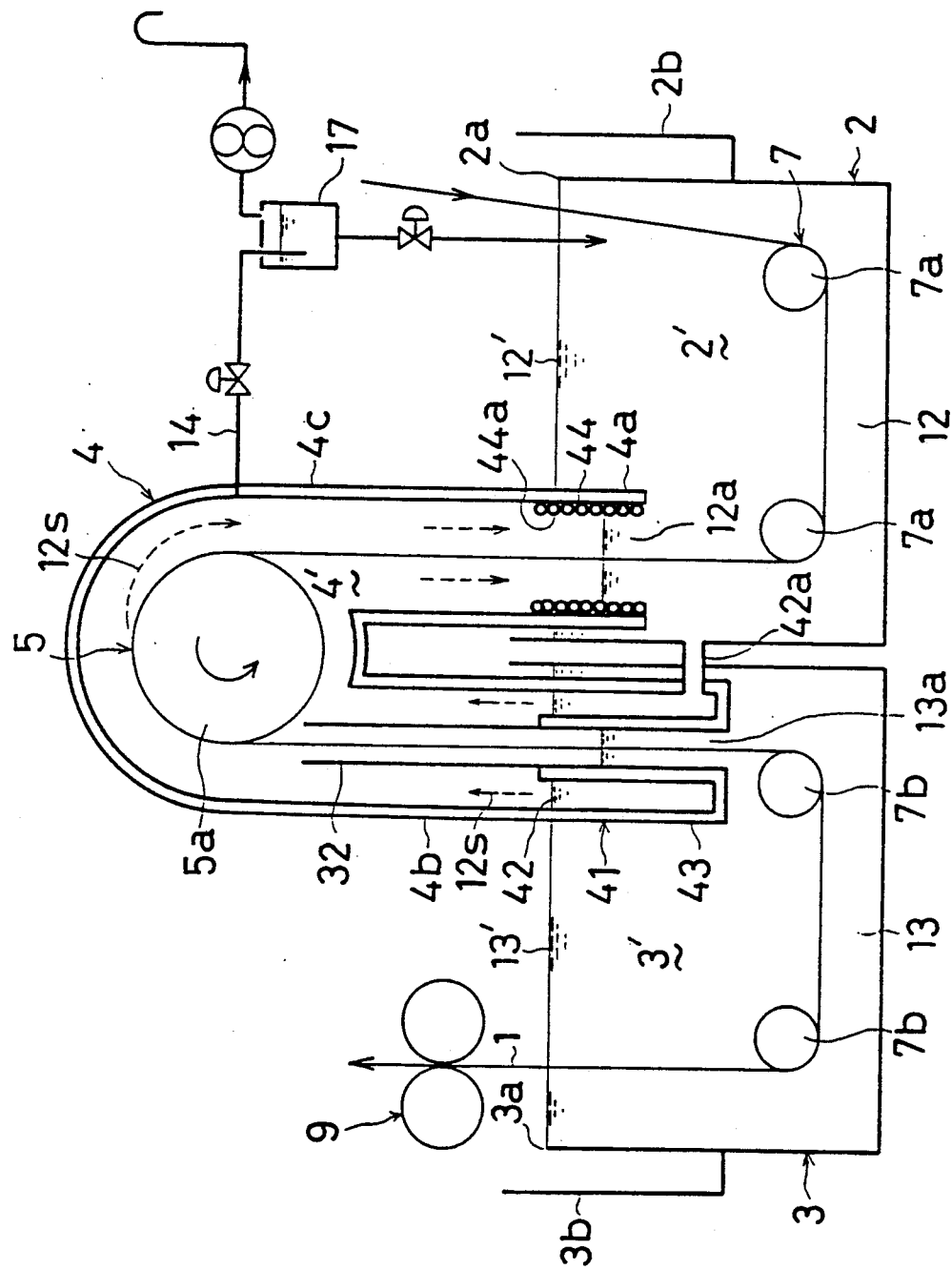
FIG. 8 is a sectional view of a varnish impregnation apparatus according to a fourth embodiment of the invention.

A varnish impregnation system according to the embodiment illustrated in FIG. 8 comprises a low-viscosity liquid storage tank 2, a varnish storage tank 3, a thermal syphon room 4, a base material heating device 5, a cooling device 6, a guiding device 7, a condensate collection device 8, a varnish impregnation control device 9 and a vapor flow device 41.

The vapor flow device 41 comprises a low-viscosity liquid storage section 43 surrounding the base material outlet 4b and a low-viscosity liquid pool 12a provided with a self-controlled heater 44. The low-viscosity liquid storage section 43 is formed at the lower end of the base material outlet 4a and communicates with the low-viscosity liquid storage tank 2 through a passage 42a so that the low-viscosity liquid 12 can be stored in a predetermined quantity. The liquid surface level of the low-viscosity storage section 42 coincides with the liquid surface 12' of the low-viscosity liquid storage tank 2 regardless of the evaporation of the low-viscosity liquid in the storage section 42. The low-viscosity liquid heater 43 comprises a wall with jacket construction surrounding the low-viscosity liquid storage section 42. The jacket allows an appropriate heating medium to flow therein to heat and evaporate the low-viscosity liquid 12 in the low-viscosity liquid storage section 42. The jacket wall of liquid heater 43 is made of heat-insulating material except for those parts in contact with the low-viscosity liquid storage section 42 and the varnish pool 13a so that the heat of the jacket is not transmitted to the varnish 13 around the varnish pool 13a. The low-viscosity liquid heater 43 is formed into a continuous jacket wall construction communicating with the surrounding wall 4c of the thermal syphon room 4.

The self-controlled heater 44 comprises a heat transfer coil through which a heating medium flows from a source not shown. The heater is used to heat and evaporate the low-viscosity liquid 12 of the low-viscosity liquid pool 12a. The evaporation capacity of the self-controlled heater 44 is lower than that of the low-viscosity liquid heater 43, and heater 44 is provided with a low-viscosity liquid heating plane 44a extending both upward and downward from the surface of the low-viscosity liquid pool 12a. The heater 44 is designed so that the evaporation capacity can be self-controlled according to variation of the internal vapor pressure of the thermal syphon room 4, in a manner similar to that of the low-viscosity liquid heating device 21 of FIG. 4.

In FIG. 8, the evaporation rate of the low-viscosity liquid to form vapor 12s in the thermal syphon room 4 is decreased by the self-controlled heater 44 as the vapor pressure rises in room 4, and the low-viscosity liquid vapor 12s is caused to flow from base material outlet 4b toward base material heater 5a and from heater 5a toward material inlet 4a, as illustrated by the arrows in FIG. 8. Thus, at least the base material passage region extending from the base material heater 5a to the varnish pool 13a is filled with atmosphere of the low-viscosity liquid vapor without air. Thus, the base material may be impregnated with varnish without air voids.

Figure 9:
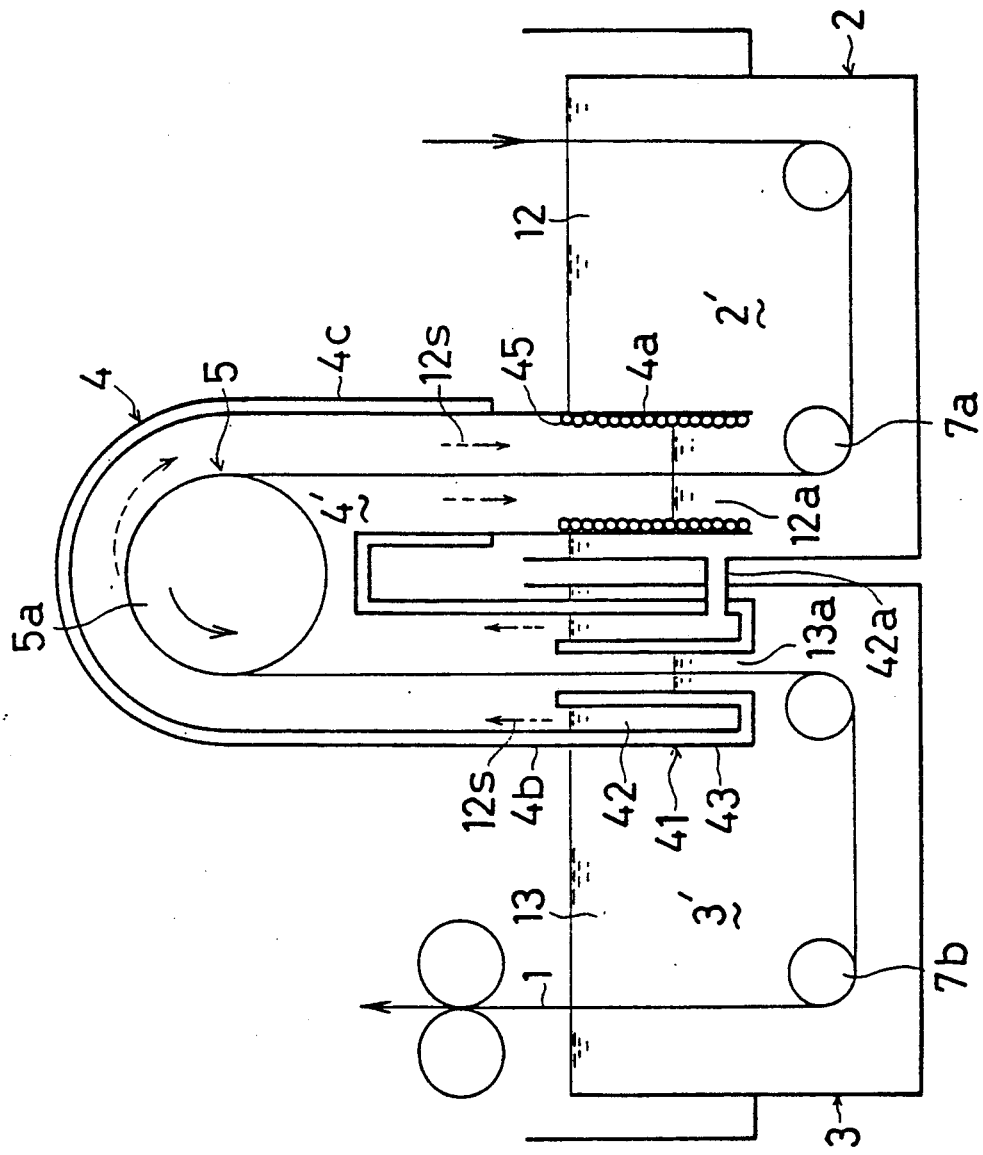
FIG. 9 is a sectional view of a varnish impregnation apparatus having a vapor cooler at the base material inlet to the thermal syphon room.

As shown in FIG. 9, the vapor flow system 41, may be provided with a cooler or cooling coil 45 at the base material inlet 4a in place of the heater 44 of the preceding embodiment. The low-viscosity liquid vapor 12s generated in the thermal syphon room 4 is condensed by the cooler 45 and collected into the low-viscosity liquid pool 12a. This results in flow of the low-viscosity liquid vapor 12s as indicated by the arrows. In this arrangement, the bleeding tube 14 is not necessarily required.

Figure 10:
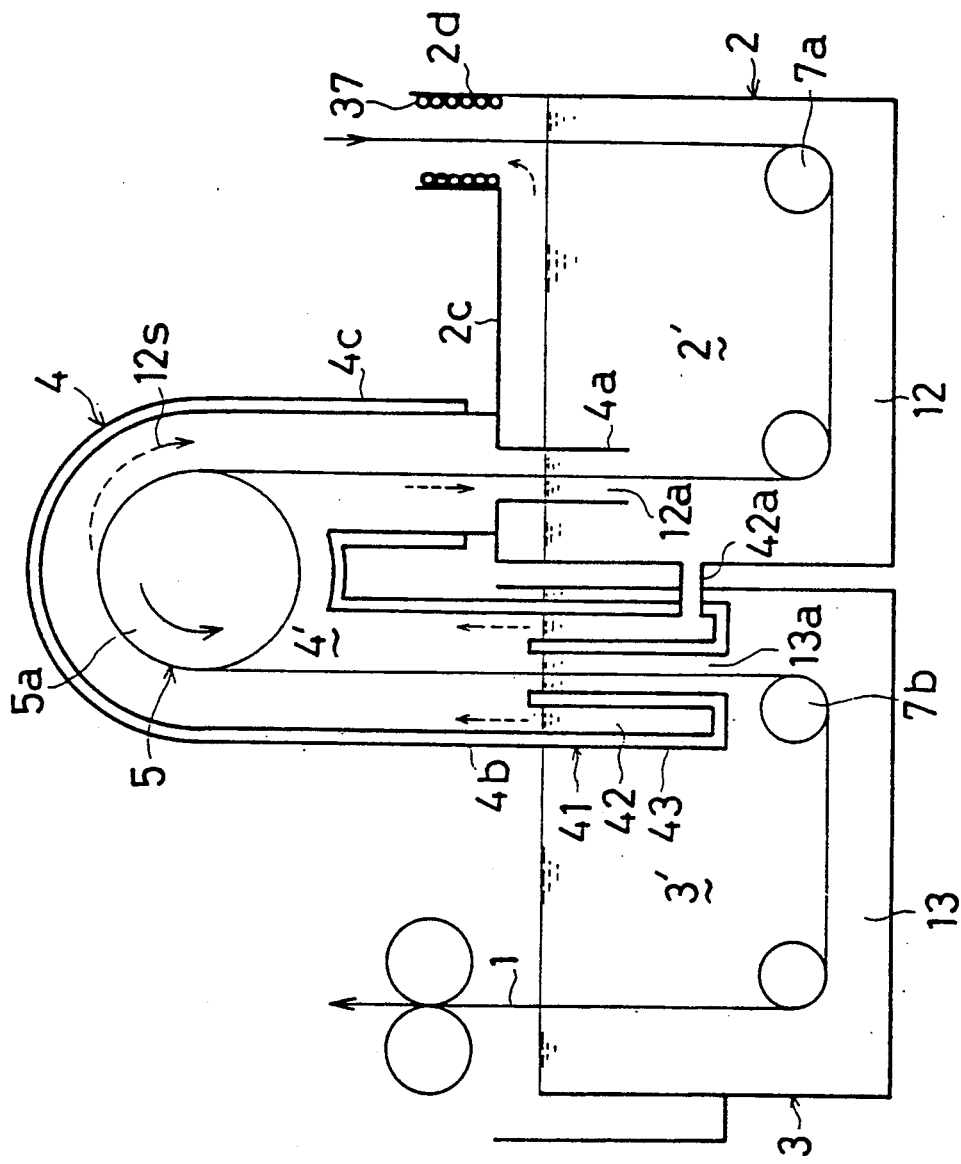
FIG. 10 is a sectional view of a varnish impregnation apparatus wherein the storage tank for storing the low-viscosity liquid is provided with a cover and a cooler at a base material inlet to the storage tank.

As shown in FIG. 10, both the heater 44 of FIG. 8 and the cooler 45 of FIG. 9 may be omitted on the side of the base material inlet 4a. The cover 2c and the cooler 37 are provided to prevent diffusion of the low-viscosity liquid vapor 12s, as described with reference to FIG. 7.

Figure 11:
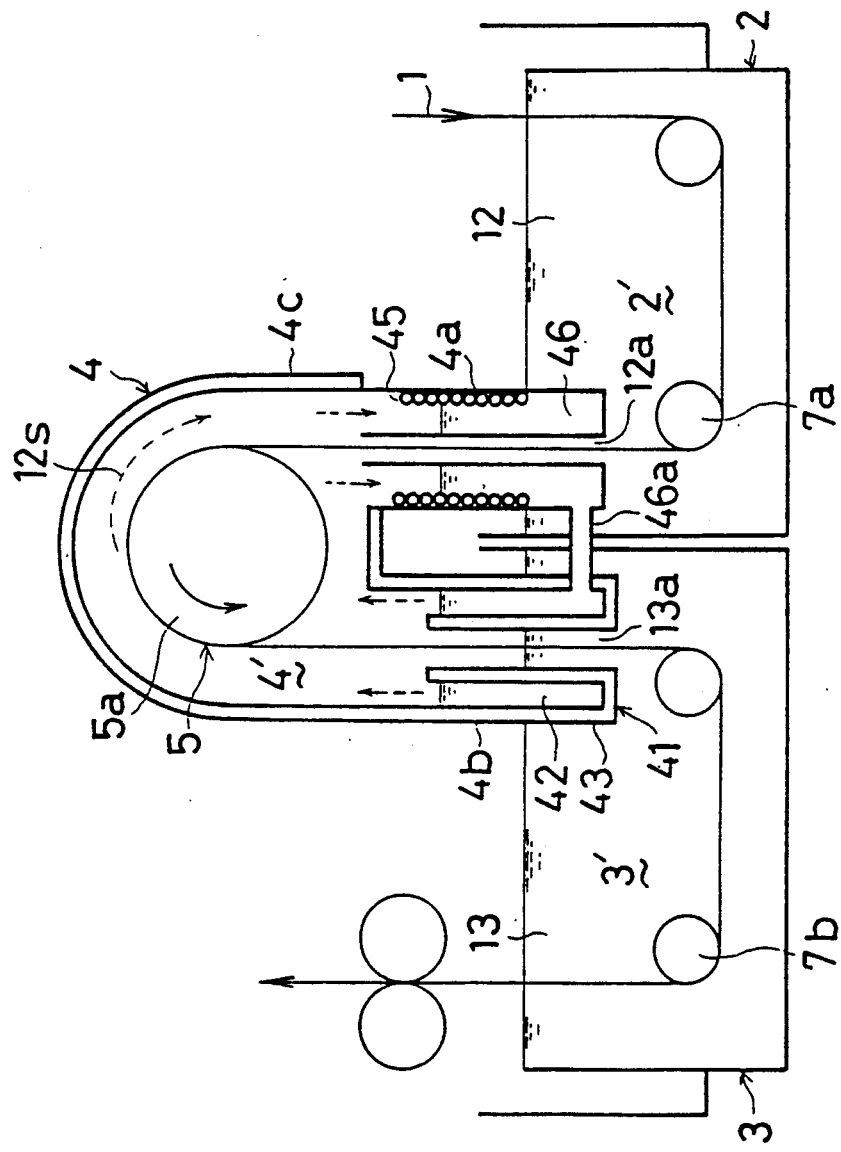
FIG. 11 is a sectional view of an impregnation apparatus having a cooler for condensing the vapor of the low-viscosity liquid into a collector which communicates with a low-viscosity liquid storage section.

FIG. 11 illustrates an embodiment wherein a liquid collector 46 communicating with the low-viscosity liquid storage section 42 through the passage 46a, is provided for collecting the condensed vapor of the low-viscosity liquid. The collector 46 is provided with a cooler 45 to condense and collect the condensate of the low-viscosity liquid vapor into collector 46.

Figure 12:
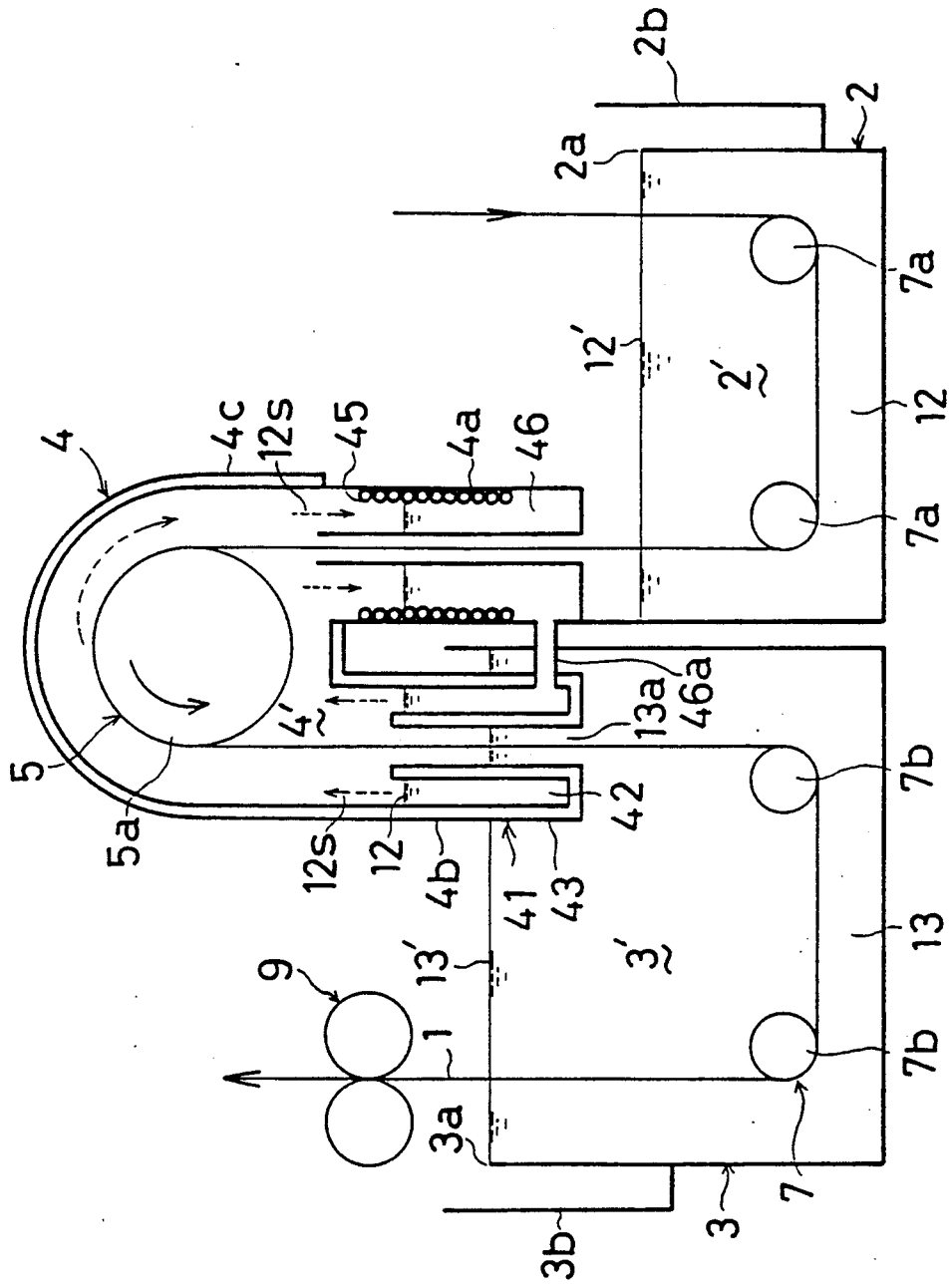
FIG. 12 is a sectional view of a fifth embodiment of a varnish impregnation system according to the present invention.

FIG. 12 illustrates an embodiment of the invention which is basically similar to the embodiment of FIG. 8 but differs from each of the foregoing embodiments in that the base material inlet 4a opens above the liquid surface 12' of the low-viscosity liquid storage tank 2. The base material 1 is exposed to the air while moving from the low-viscosity liquid storage tank 2 into the thermal syphon room 4, but air will not enter into the base material 1 before the base material moves into the thermal syphon room 4 since the base material is impregnated with the low-viscosity liquid. Thus, absence of the liquid seal at the base material inlet 4a causes no problem.

Figure 13:
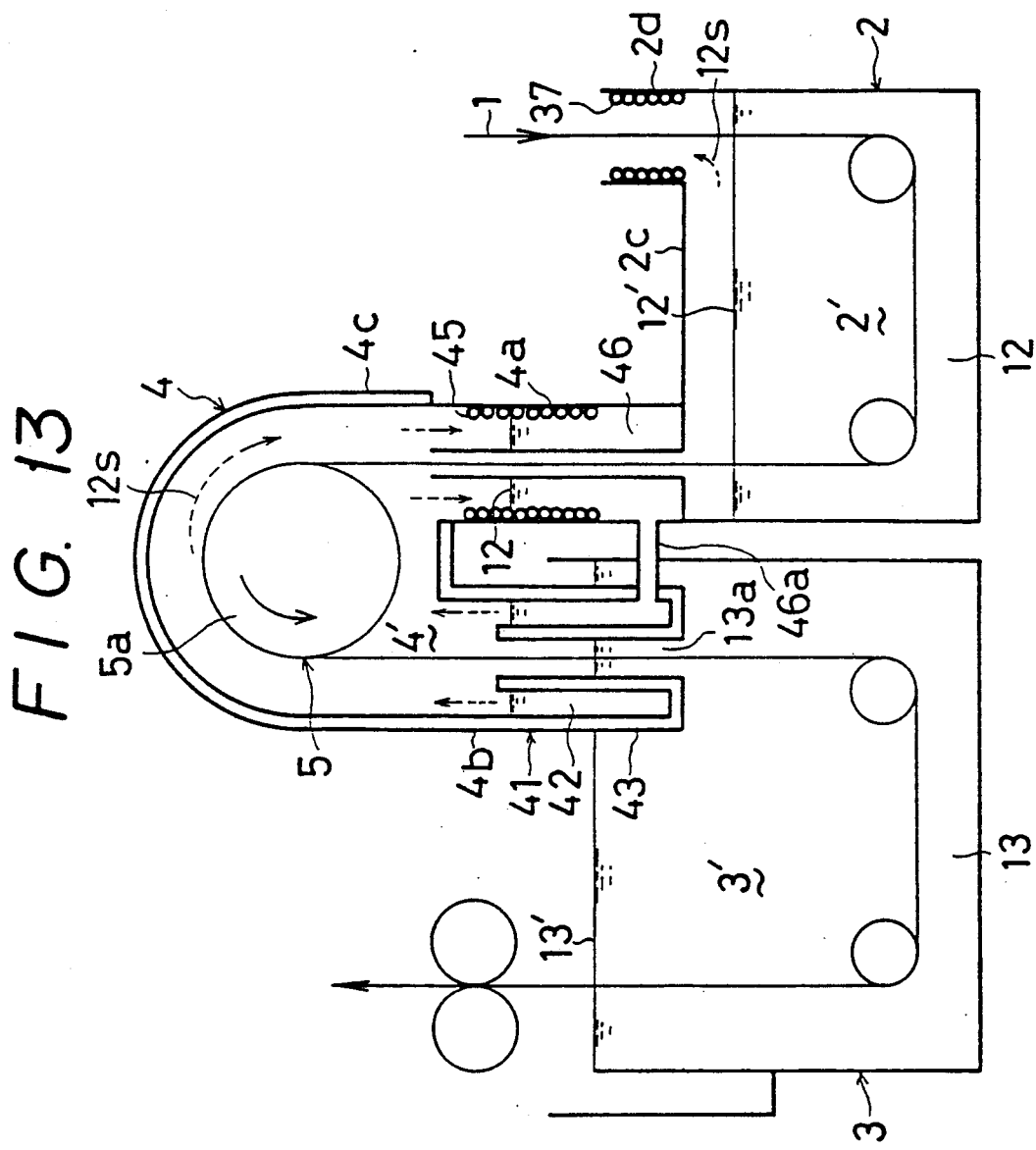
FIGS. 13 and 14 are side views of variations of the varnish impregnation process according to the present invention.
Figure 14:
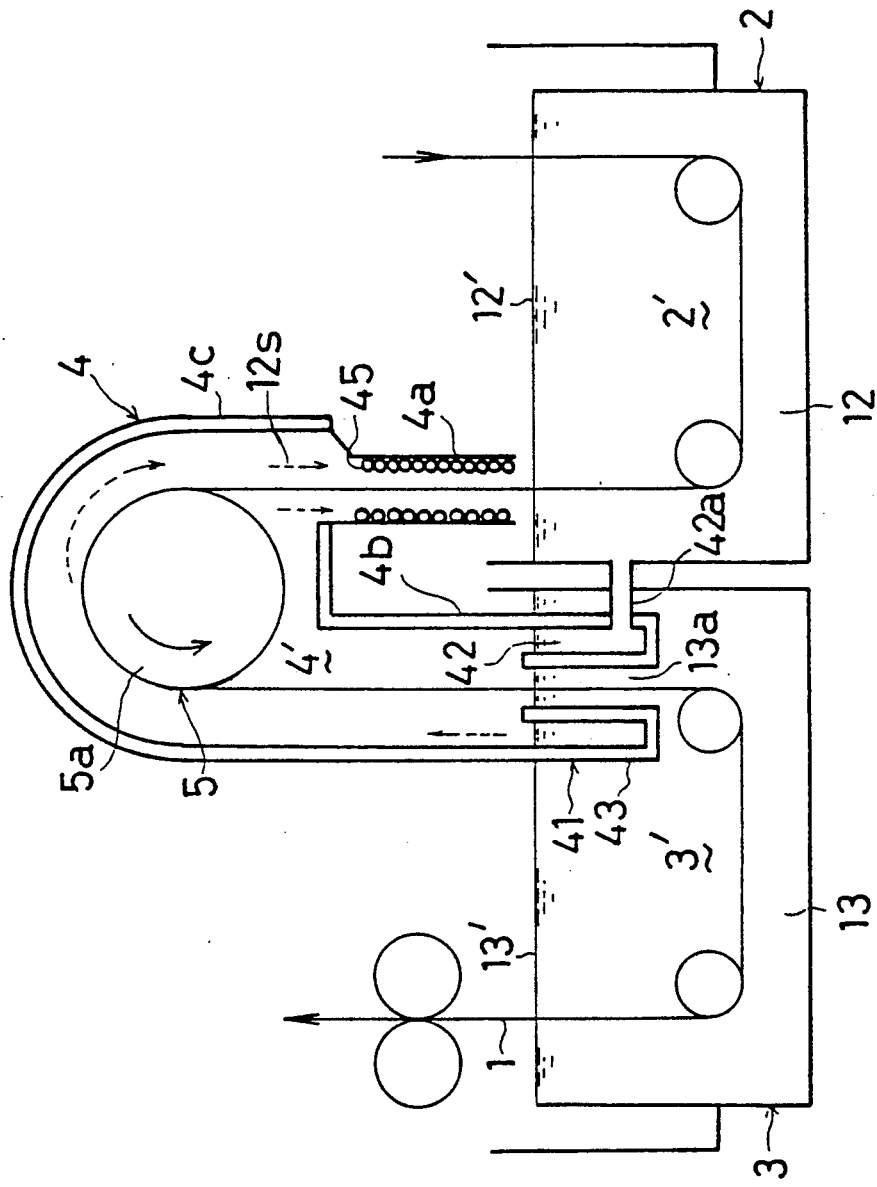

In this case, and as shown in FIG. 13, the vapor diffusion prevention devices 2c and 37 may be provided for preventing the diffusion of the low-viscosity liquid vapor 12s from the low-viscosity liquid storage tank 2. The effects of the cover 2c and cooling coil 37 are greater than that of a liquid seal at the base inlet 4a. Also, as shown in FIG. 14, instead of providing the low-viscosity liquid collector 46, the condensate may be directly collected into the low-viscosity liquid storage tank 2 from the base material inlet 4a.

While specific embodiments of the invention have been described in detail, obvious modifications and substitutions falling within the spirit and scope of the invention will be obvious. It is intended therefore to be limited only by the scope of the appended claims.

I claim:

1. A varnish impregnation method comprising:
 passing a sheet-like base material in sequence through a low-viscosity liquid stored in a low-viscosity liquid storage region to thereby impregnate said low-viscosity liquid into said base material, a thermal syphon region, and a varnish stored in a varnish storage region, said base material being passed through a base material outlet passage closed by a liquid surface of said varnish storage region in passing from said thermal syphon region to said varnish storage region; and
 heating said base material in said thermal syphon region, thereby producing a vapor of the low-viscosity liquid impregnated in said base material.

2. A varnish impregnation method as claimed in claim 1 wherein the base material is heated to a temperature higher than the condensing temperature of the low-viscosity liquid vapor in a base material passage region extending from a base material heater positioned in said thermal syphon region to said varnish storage region.

3. A varnish impregnation method as claimed in claim 1 wherein said low-viscosity liquid vapor generated in said thermal syphon region is condensed and the condensed low-viscosity liquid is collected.

4. A varnish impregnation method as claimed in claim 1 wherein said thermal syphon region is kept in communication with said low-viscosity liquid storage region through an inlet passage closed by a liquid surface of said low-viscosity liquid storage region, and low-viscosity liquid in the inlet passage is heated so that the rate of evaporation of the low-viscosity liquid is controlled in accordance with fluctuations of the low viscosity liquid surface level in said inlet passage.

5. A varnish impregnation method as claimed in claim 1 wherein said base material is passed from said low-viscosity liquid storage region to said thermal syphon region through a base material inlet passage and the low-viscosity liquid vapor generated in the thermal syphon region is allowed to flow from the side of the base material outlet passage to the side of the base material inlet passage in the thermal syphon region.

6. A varnish impregnation method as claimed in claim 1 wherein a communication route between said thermal syphon region and said varnish storage region is heated to a temperature higher than the boiling point temperature of said low-viscosity liquid.

7. A varnish impregnation method as claimed in claim 1 wherein the step of passing the base material through the low-viscosity liquid storage region comprises passing the base material through a low-viscosity solvent in the low-viscosity liquid storage region.

8. A varnish impregnation method as claimed in claim 1 wherein a pool of said low-viscosity liquid is provided adjacent the base material outlet passage and the low-viscosity liquid in said pool is heated to form a vapor of the low-viscosity liquid which flows toward said thermal syphon region.

9. A varnish impregnation method as claimed in claim 1 and further comprising passing said base material from said low-viscosity liquid storage region to said thermal syphon region through a base material inlet passage having an opening below a liquid surface of the low-viscosity liquid storage region, and controlling the rate of evaporation of the low-viscosity liquid in said base material inlet passage in accordance with a vapor pressure in said thermal syphon region.

10. A varnish impregnation method as claimed in claim 9 wherein the step of controlling the rate of evaporation comprises sensing a level of the liquid surface in said base material inlet passage and varying the temperature of the low-viscosity liquid in said base material inlet passage according to the sensed level of the liquid surface in said base material inlet passage.

* * * * *